United States Patent
Noguchi et al.

(10) Patent No.: US 11,866,528 B2
(45) Date of Patent: Jan. 9, 2024

(54) POLYMER, AND OXYGEN ABSORBENT AND RESIN COMPOSITION USING SAME

(71) Applicant: KURARAY CO., LTD., Okayama (JP)

(72) Inventors: Daiki Noguchi, Niigata (JP); Takashi Fukumoto, Niigata (JP); Keiji Kubo, Ibaraki (JP)

(73) Assignee: KURARAY CO., LTD., Okayama (JP)

( * ) Notice: Subject to any disclaimer, the term of this patent is extended or adjusted under 35 U.S.C. 154(b) by 621 days.

(21) Appl. No.: 17/049,391

(22) PCT Filed: Apr. 12, 2019

(86) PCT No.: PCT/JP2019/015921
§ 371 (c)(1),
(2) Date: Oct. 21, 2020

(87) PCT Pub. No.: WO2019/220825
PCT Pub. Date: Oct. 31, 2019

(65) Prior Publication Data
US 2021/0246238 A1 Aug. 12, 2021

(30) Foreign Application Priority Data
Apr. 23, 2018 (JP) ................. 2018-082510

(51) Int. Cl.
C08F 20/28 (2006.01)
B01J 20/26 (2006.01)

(52) U.S. Cl.
CPC ............. *C08F 20/28* (2013.01); *B01J 20/261* (2013.01); *B01J 20/264* (2013.01); *B01J 20/267* (2013.01); *B01J 2220/46* (2013.01)

(58) Field of Classification Search
CPC ........ C08F 20/28; B01J 20/261; B01J 20/264; B01J 20/267; B01J 2220/46
USPC ....................................................... 502/402
See application file for complete search history.

(56) References Cited

U.S. PATENT DOCUMENTS

| | | |
|---|---|---|
| 3,644,568 A | 2/1972 | Tilley et al. |
| 2002/0127400 A1 | 9/2002 | Uchida et al. |
| 2003/0060563 A1 | 3/2003 | Kazufumi et al. |
| 2008/0045626 A1 | 2/2008 | Lewandowski et al. |
| 2010/0055364 A1 | 3/2010 | Yamanaka et al. |
| 2013/0156959 A1 | 6/2013 | Okazaki |

FOREIGN PATENT DOCUMENTS

| | | |
|---|---|---|
| CN | 1356965 A | 7/2002 |
| CN | 103025766 A | 4/2013 |
| EP | 3 718 996 | 10/2020 |
| JP | 59-104338 A | 6/1984 |
| JP | 61-101518 A | 5/1986 |
| JP | 63-130610 A | 6/1988 |
| JP | 05-078459 A | 3/1993 |
| JP | 2008-506816 A | 3/2008 |
| JP | 2008-308420 | 12/2008 |
| JP | 2009-114091 | 5/2009 |
| JP | 2014-024014 A | 2/2014 |
| JP | 2014-152252 | 8/2014 |
| WO | 02/06206 A2 | 1/2002 |
| WO | 2007/040060 A1 | 4/2007 |
| WO | 2010-095390 A1 | 8/2010 |

OTHER PUBLICATIONS

Yang et al., "Interactions Between Sodium p-Perfluorononenyloxy Benzene Sulfonate and Alkyl Quaternary Ammonium Salts" Beijing FLUOBON Surfactant Institute, Beijing 100096, China; College of Petroleum Engineering, China University of Petroleum (Huadong) , Qingdao 266555, China; Department of Chemistry, Beijing Institute of Technology, Beijing 100081, China), translation.

Conceicao et al., "Supercritical $CO_2$ as an effective medium for a novel conversion of glycerol and alcohols in the heterogeneous telomerisation of butadiene" Green Chemistry 2012, Accepted Nov. 29, 2011 pp. 673-681.

International Search Report, WIPO, Application No. PCT/JP2019/015921, dated Jun. 25, 2019, English translation.

International Preliminary Report on Patentability, WIPO, Application No. PCT/JP2019/015921, dated Oct. 27, 2020, English translation.

EESR issued in EP Patent Application No. 19792465, Dec. 15, 2021.

*Primary Examiner* — Edward M Johnson
(74) *Attorney, Agent, or Firm* — GREENBLUM & BERNSTEIN, P.L.C.

(57) ABSTRACT

A polymer comprising a structural unit derived from a compound (A) represented by formula (I):

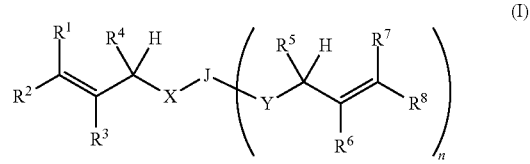

wherein X, Y, $R^1$, $R^2$, $R^7$, $R^8$, $R^3$, $R^4$, $R^5$, $R^6$, J, and n are as defined in the description, provides a resin composition that has an excellent curability and sufficiently polymerizes for curing even in the presence of oxygen in an air atmosphere to form a cured product having excellent appearance.

15 Claims, No Drawings

POLYMER, AND OXYGEN ABSORBENT AND RESIN COMPOSITION USING SAME

TECHNICAL FIELD

The present invention relates to a polymer comprising a structural unit derived from a specific unsaturated double bond-comprising compound, and an oxygen absorbent and a resin composition each comprising the polymer.

BACKGROUND ART

A radical polymerizable resin such as an unsaturated polyester resin used in a coating material has an unsaturated bond in a polymer main chain and is polymerized to cure by the use of a vinyl crosslinking agent. When such a radical polymerizable resin is applied to a coating material, the resin is cured usually in an air atmosphere. Therefore, the polymerization reaction is likely to be inhibited by oxygen in the air to cause a problem of a slow curing and a sticky surface. As a means for preventing these problems, Patent Literature 1 and Patent Literature 2 propose a technique of adding an oxygen absorbent to a resin. In addition, as the oxygen absorbent, allyl glycidyl ether is described in Patent Literature 3 and Patent Literature 4.

CITATION LIST

Patent Literature

Patent Literature 1: JP S63-130610 A
Patent Literature 2: JP H05-78459 A
Patent Literature 3: JP S61-101518 A
Patent Literature 4: U.S. Pat. No. 3,644,568

SUMMARY OF INVENTION

Technical Problem

Conventionally, styrene has been widely used as a reactive diluent in an application of coating material, but from the viewpoint of environmental protection, styrene comes to be largely replaced by a hardly volatile (meth)acrylic acid ester. However, the use of a (meth)acrylic acid ester inhibits the polymerization curing reaction by oxygen more than using a conventional reactive diluent and reduces the curability.

Accordingly, an object of the present invention is to provide a polymer that provides a resin composition sufficiently polymerizing for curing even in the presence of oxygen in an air atmosphere and having an excellent curability to form a cured product having an excellent appearance. Another object of the present invention is to provide an oxygen absorbent comprising the polymer. Still another object of the present invention is to provide a resin composition having an excellent curability, which comprises the oxygen absorbent, and a cured product obtained by curing the resin composition.

Solution to Problem

As a result of intensive studies to achieve the above objects, the present inventors have found that when a polymer comprising a structural unit derived from a specific unsaturated double bond-comprising compound is incorporated into a conventional curable composition such as a coating material comprising a polyfunctional compound such as a polyfunctional monomer or a radical polymerizable resin, the resultant resin composition is excellent in the curability and sufficiently polymerizes for curing even in the presence of oxygen in an air atmosphere to form a coating film having excellent appearance. The present invention has been completed by further studying based on the findings.

That is, the present invention provides the following [1] to [15].

[1] A polymer comprising a structural unit derived from a compound (A) represented by formula (I):

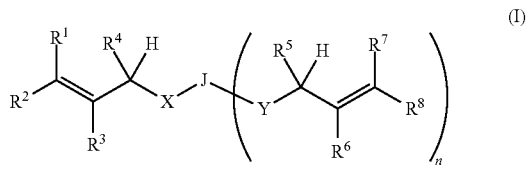

wherein:
X and Y each independently represent a chalcogen atom;
$R^1$, $R^2$, $R^7$, and $R^8$ each independently represent any one selected from the group consisting of an alkyl group having 1 to 6 carbon atoms, an alkenyl group having 2 to 6 carbon atoms, an aryl group, and an aralkyl group;
$R^3$, $R^4$, $R^5$, and $R^6$ each independently represent any one selected from the group consisting of a hydrogen atom, an alkyl group having 1 to 6 carbon atoms, an alkenyl group having 2 to 6 carbon atoms, an aryl group, and an aralkyl group;
J represents a linking group comprising an aliphatic hydrocarbon having 3 to 15 carbon atoms which has at least one substituent selected from the group consisting of a hydroxy group, a (meth)acryloyloxy group, a 4-vinylphenoxy group, and an alkenyloxy group having 2 to 6 carbon atoms;
at least one selected from the at least one substituent is any one selected from the group consisting of a (meth)acryloyloxy group, a 4-vinylphenoxy group, and an alkenyloxy group having 2 to 6 carbon atoms;
a carbon atom in the linking group may be replaced by an oxygen atom; and
n represents an integer of 1 to 5;
provided that Ys, $R^5$'s, $R^6$'s, $R^7$'s, and $R^8$'s, if present, may represent different atoms or groups, respectively.

[2] The polymer according to [1], wherein X is an oxygen atom.

[3] The polymer according to [1] or [2], wherein $R^3$ and $R^6$ are hydrogen atoms.

[4] The polymer according to any one of [1] to [3], wherein $R^4$ and $R^5$ are each independently a hydrogen atom or a methyl group.

[5] The polymer according to any one of [1] to [4], wherein the compound (A) is a compound (A') represented by formula (II):

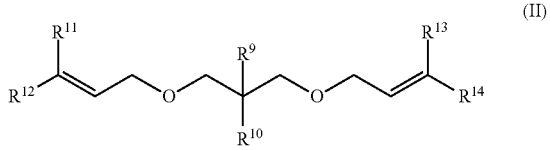

wherein:
$R^9$ represents a hydrogen atom or a methyl group;
$R^{10}$ represents any one selected from the group consisting of a (meth)acryloyloxy group, a 4-vinylphenoxy group, and an alkenyloxy group having 2 to 6 carbon atoms; and $R^{11}$, $R^{12}$, $R^{13}$, and $R^{14}$ each independently represent any one selected from the group consisting of an alkyl group having 1 to 6 carbon atoms, an alkenyl group having 2 to 6 carbon atoms, an aryl group, and an aralkyl group.

[6] The polymer according to [5], wherein $R^9$ is a hydrogen atom.

[7] The polymer according to [5] or [6], wherein $R^{10}$ is a (meth)acryloyloxy group.

[8] The polymer according to any one of [1] to [7], wherein the polymer comprises a structural unit derived from a monomer (B) other than the compound (A).

[9] The polymer according to [8], wherein the monomer (B) is a monofunctional monomer (B1).

[10] The polymer according to [9], wherein the monofunctional monomer (B1) is an alkyl (meth)acrylate.

[11] An oxygen absorbent comprising the polymer according to any one of [1] to [10].

[12] The oxygen absorbent according to [11], wherein the oxygen absorbent comprises a transition metal salt in an amount of 0.001 to 10 mol % based on an amount of the vinyl group in the polymer.

[13] A resin composition comprising the oxygen absorbent according to [11] or [12] and a polyfunctional monomer and/or a resin.

[14] The resin composition according to [13], wherein the polyfunctional monomer is a polyvalent (meth)acrylic acid ester.

[15] A cured product obtained by curing the resin composition according to [13] or [14].

Advantageous Effects of Invention

According to the present invention, a polymer that provides a resin composition having an excellent curability is provided. The resin composition sufficiently polymerizes even in the presence of oxygen in an air atmosphere to form a cured product having an excellent appearance. Further provided is an oxygen absorbent comprising the polymer. According to the present invention, still further provided are a resin composition having an excellent curability comprising the oxygen absorbent and a cured product obtained by curing the resin composition.

DESCRIPTION OF EMBODIMENTS

The polymer of the present invention comprises a structural unit derived from the compound (A) represented by formula (I) (hereinafter, also referred to as "compound (A)"). With such a structural unit, the polymer provides a resin composition having an excellent curability that allows the resin composition to sufficiently polymerize for curing even in the presence of oxygen in an air atmosphere to form a cured product having an excellent appearance.

Although not limit the present invention, the advantageous effects mentioned above are largely attributable to the effective absorbance of oxygen by the carbon-carbon double bond in the structural unit derived from the compound (A) during the curing process of the resin composition and a large contribution of the carbon-carbon double bond to the crosslinking reaction (polymerization for curing).

Polymer

The polymer of the present invention comprises a structural unit derived from the compound (A) represented by formula (I):

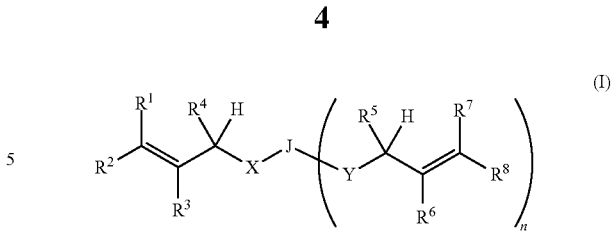

wherein:
X and Y each independently represent a chalcogen atom;
$R^1$, $R^2$, $R^7$, and $R^8$ each independently represent any one selected from the group consisting of an alkyl group having 1 to 6 carbon atoms, an alkenyl group having 2 to 6 carbon atoms, an aryl group, and an aralkyl group;
$R^3$, $R^4$, $R^5$, and $R^6$ each independently represent any one selected from the group consisting of a hydrogen atom, an alkyl group having 1 to 6 carbon atoms, an alkenyl group having 2 to 6 carbon atoms, an aryl group, and an aralkyl group;
J represents a linking group comprising an aliphatic hydrocarbon having 3 to 15 carbon atoms which has at least one substituent selected from the group consisting of a hydroxy group, a (meth)acryloyloxy group, a 4-vinylphenoxy group, and an alkenyloxy group having 2 to 6 carbon atoms;
at least one selected from the at least one substituent is any one selected from the group consisting of a (meth)acryloyloxy group, a 4-vinylphenoxy group, and an alkenyloxy group having 2 to 6 carbon atoms;
a carbon atom in the linking group may be replaced by an oxygen atom; and
n represents an integer of 1 to 5;
provided that Ys, $R^5$'s, $R^6$'s, $R^7$'s, and $R^8$'s, if present, may represent different atoms or groups, respectively.

In formula (I), X and Y each independently represent a chalcogen atom. From the viewpoint of the ease of production of the compound (A) and from the viewpoint of improving the oxygen absorbability, each of X and Y is preferably an oxygen atom or a sulfur atom, and more preferably an oxygen atom.

In formula (I), $R^1$, $R^2$, $R^7$, and $R^8$ each independently represent any one selected from the group consisting of an alkyl group having 1 to 6 carbon atoms, an alkenyl group having 2 to 6 carbon atoms, an aryl group, and an aralkyl group.

Examples of the alkyl group having 1 to 6 carbon atoms represented by $R^1$, $R^2$, $R^7$, and $R^8$ include a methyl group, an ethyl group, a n-propyl group, an isopropyl group, a n-butyl group, an isobutyl group, a sec-butyl group, a tert-butyl group, a n-pentyl group, an isopentyl group, a neopentyl group, a n-hexyl group, a cyclopropyl group, a cyclobutyl group, a cyclopentyl group, and a cyclohexyl group.

Examples of the alkenyl group having 2 to 6 carbon atoms represented by $R^1$, $R^2$, $R^7$, and $R^8$ include a vinyl group, an allyl group, a propenyl group, an isopropenyl group, a butenyl group, an isobutenyl group, a pentenyl group, a hexenyl group, such as a cis-3-hexenyl group, and a cyclohexenyl group.

Examples of the aryl group represented by $R^1$, $R^2$, $R^7$, and $R^8$ include a phenyl group, a tolyl group, a xylyl group, and a naphthyl group.

Examples of the aralkyl group represented by $R^1$, $R^2$, $R^7$, and $R^8$ include a benzyl group, a 2-phenylethyl group, a 2-naphthylethyl group, and a diphenylmethyl group.

Among these, $R^1$, $R^2$, $R^7$, and $R^8$ are each independently preferably an alkyl group having 1 to 6 carbon atoms or an alkenyl group having 2 to 6 carbon atoms, more preferably an alkyl group having 1 to 4 carbon atoms, and still more preferably a methyl group.

In formula (I), $R^3$, $R^4$, $R^5$, and $R^6$ each independently represent any one selected from the group consisting of a hydrogen atom, an alkyl group having 1 to 6 carbon atoms, an alkenyl group having 2 to 6 carbon atoms, an aryl group, and an aralkyl group. Examples of the alkyl group having 1 to 6 carbon atoms, the alkenyl group having 2 to 6 carbon atoms, the aryl group, and the aralkyl group each represented by $R^3$, $R^4$, $R^5$, and $R^6$ are the same as those for $R^1$, $R^2$, $R^7$, and $R^8$ described above, and omitted here to avoid redundant description.

Among these, $R^3$, $R^4$, $R^5$, and $R^6$ are each independently preferably any one of a hydrogen atom, an alkyl group having 1 to 3 carbon atoms, an alkenyl group having 2 or 3 carbon atoms, and an aryl group, more preferably a hydrogen atom or a methyl group, and still more preferably a hydrogen atom. In particular, from the viewpoint of improving the oxygen absorbability of the obtained polymer, $R^3$ and $R^6$ are each preferably a hydrogen atom, $R^4$ and $R^5$ are each independently preferably a hydrogen atom or a methyl group, and more preferably both hydrogen atoms.

In formula (I), J represents a linking group comprising an aliphatic hydrocarbon having 3 to 15 carbon atoms which has at least one substituent selected from the group consisting of a hydroxy group, a (meth)acryloyloxy group, a 4-vinylphenoxy group, and an alkenyloxy group having 2 to 6 carbon atoms. However, at least one selected from the at least one substituent is any one selected from the group consisting of a (meth)acryloyloxy group, a 4-vinylphenoxy group, and an alkenyloxy group having 2 to 6 carbon atoms.

That is, when the linking group represented by J has one substituent, the substituent is any one selected from the group consisting of a (meth)acryloyloxy group, a 4-vinylphenoxy group, and an alkenyloxy group having 2 to 6 carbon atoms. When the linking group represented by J has two or more substituents, at least one of the substituents is any one selected from the group consisting of a (meth)acryloyloxy group, a 4-vinylphenoxy group, and an alkenyloxy group having 2 to 6 carbon atoms, and the remaining substituent or substituents may be a hydroxy group. In addition, a carbon atom in the linking group may be replaced by an oxygen atom.

From the viewpoint of easy handling of the compound (A), the linking group is preferably an aliphatic hydrocarbon group having 3 to 10 carbon atoms having the substituent described above, and more preferably an aliphatic hydrocarbon group having 3 to 5 carbon atoms having the substituent described above. The number of carbon atoms is a value excluding the number of carbon atoms of the substituent, and when a carbon atom in the linking group is replaced by an oxygen atom, the number of carbon atoms means the number before replacement.

As described above, the linking group represented by J has at least one substituent selected from the group consisting of a hydroxy group, a (meth)acryloyloxy group, a 4-vinylphenoxy group, and an alkenyloxy group having 2 to 6 carbon atoms. The alkenyloxy group having 2 to 5 carbon atoms may be a vinyloxy group having 2 to 5 carbon atoms. The number of the substituents in the linking group represented by J is not particularly limited, and for example, 1 to 6, preferably 1 to 4, more preferably 1 to 3, still more preferably 1 or 2, and particularly preferably 1.

From the viewpoint of improving the oxygen absorbability of the obtained polymer, the substituent for the linking group is preferably a (meth)acryloyloxy group, a 4-vinylphenoxy group, or an alkenyloxy group having 2 to 6 carbon atoms, and more preferably a (meth)acryloyloxy group. The term "(meth)acryloyl" used herein means either acryloyl or methacryloyl.

Examples of the partial structure of the linking group represented by J when excluding the substituent(s) include any of the structures represented by formula (J-1), and the structure represented by formula (J-2) is preferable from the viewpoint of easy availability of a raw material and improving the oxygen absorbability of the obtained polymer. In formulas (J-1) and (J-2), "*" represents a bonding cite to X, Y, or the substituent.

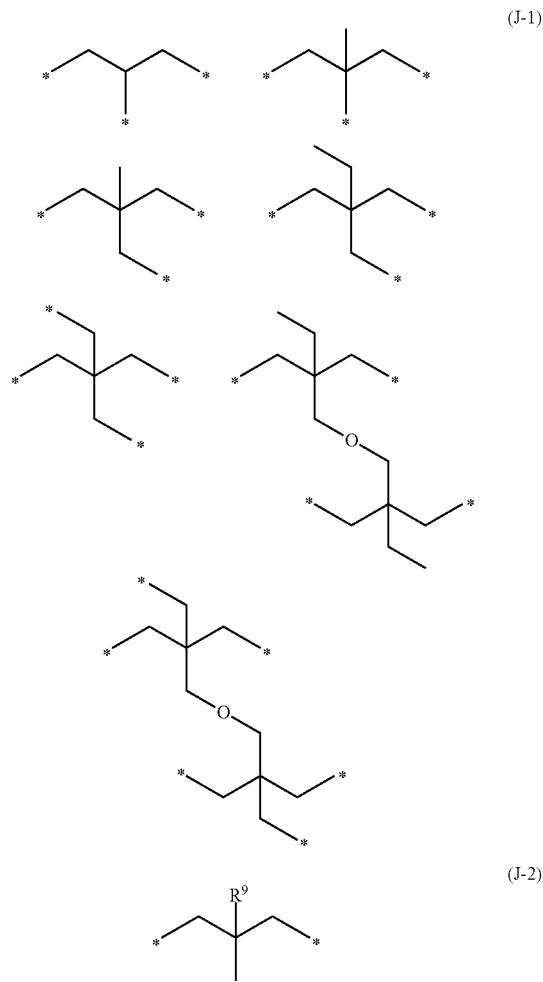

In formula (J-2), $R^9$ represents a hydrogen atom or a methyl group, preferably a hydrogen atom.

In formula (I), n represents an integer of 1 to 5, preferably an integer of 1 to 4, and more preferably 1 or 2 from the viewpoint of easy availability of a raw material.

Examples of the compound (A) represented by formula (I) include the following compounds, and a compound (A') represented by formula (II) is preferable from the viewpoint of the oxygen absorbability.

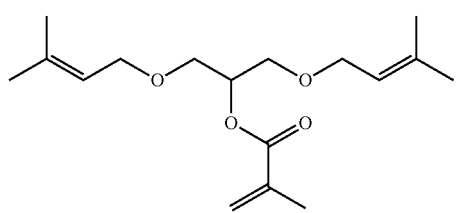
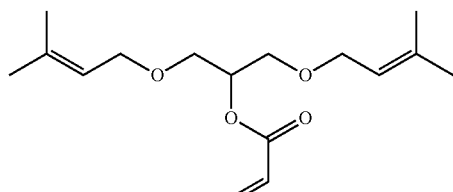
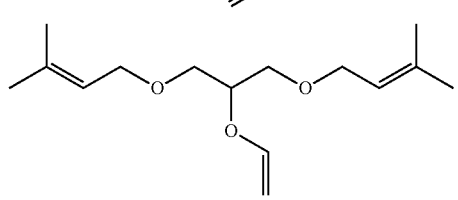
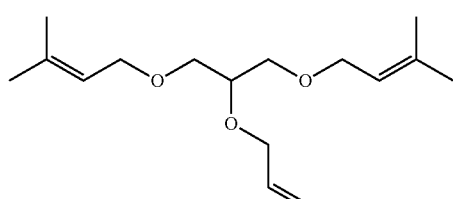
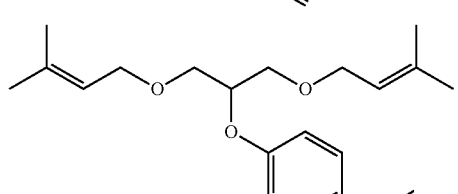
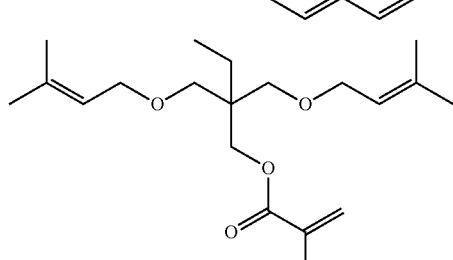
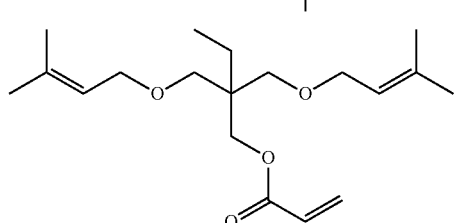
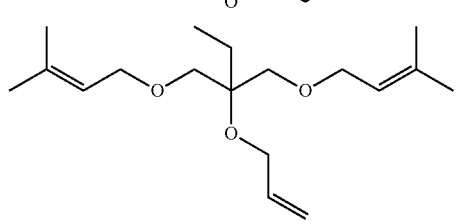
-continued
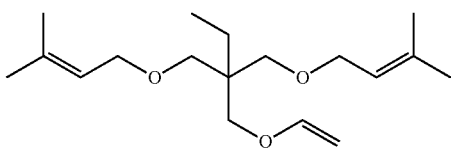
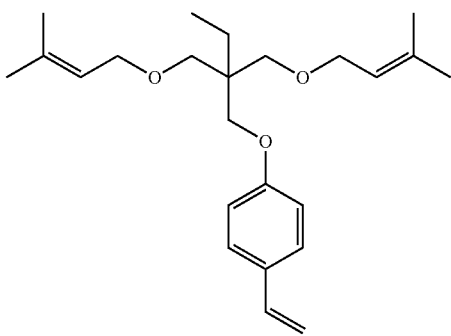
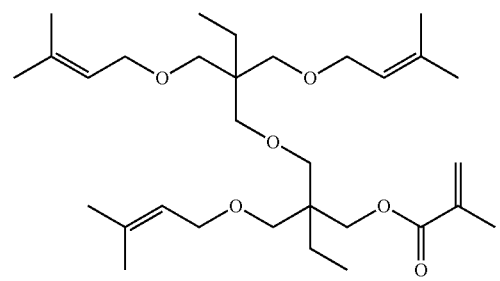
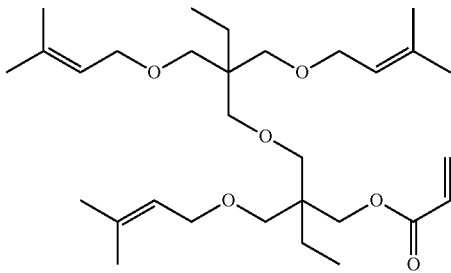
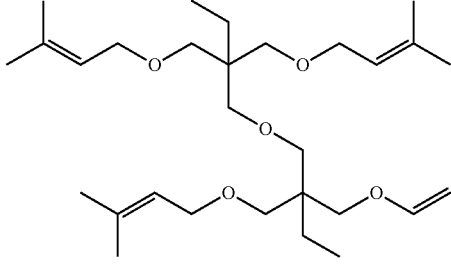
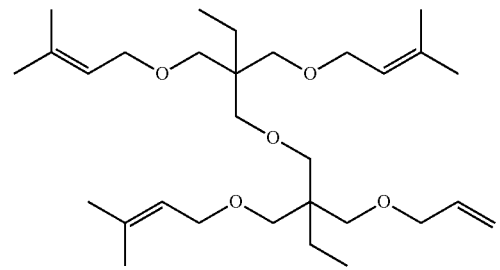

-continued
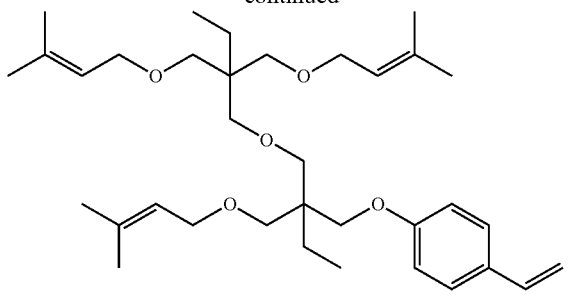
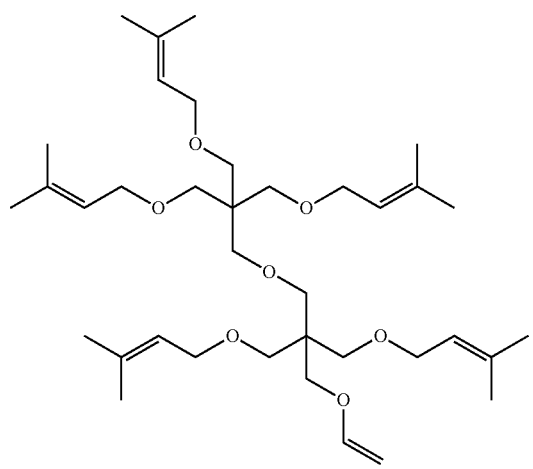
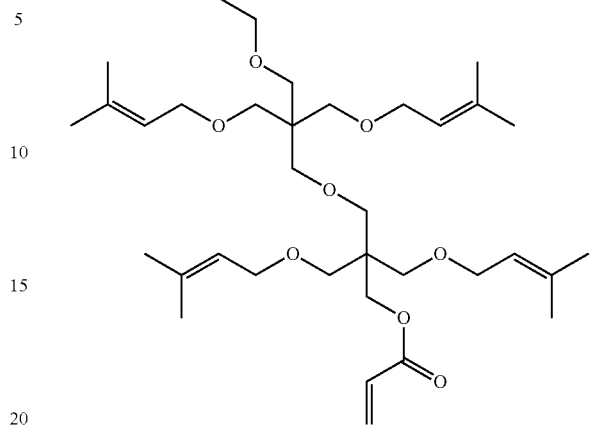
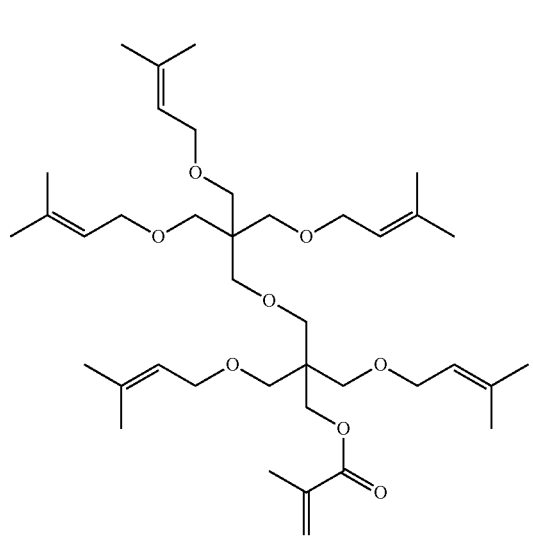

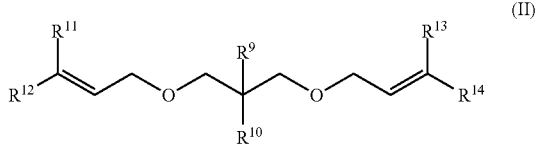

In t formula (II), $R^9$ represents a hydrogen atom or a methyl group, and preferably a hydrogen atom. $R^{10}$ represents any one selected from the group consisting of a (meth)acryloyloxy group, a 4-vinylphenoxy group, and an alkenyloxy group having 2 to 6 carbon atoms, and preferably a (meth)acryloyloxy group. The alkenyloxy group having 2 to 6 carbon atoms may be a vinyloxy group having 2 to 6 carbon atoms.

In formula (II), $R^{11}$, $R^{12}$, $R^{13}$, and $R^{14}$ each independently represent any one selected from the group consisting of an alkyl group having 1 to 6 carbon atoms, an alkenyl group having 2 to 6 carbon atoms, an aryl group, and an aralkyl group. Examples and preferable examples thereof are the same as those described in $R^1$, $R^2$, $R^7$, and $R^8$ in formula (I).

The method for producing the compound (A) is not particularly limited, and the compound (A) is produced by using known methods alone or in combination. For example, the compound (A) in which the substituent for the linking group represented by J is a (meth)acryloyloxy group is produced by converting a corresponding alcohol into a (meth)acryloyloxy group by using a known esterification reaction.

The polymer of the present invention comprises the structural unit derived from the compound (A) as described above. The polymerization cite of the compound (A) is not particularly limited, but it is preferable that the compound (A) polymerizes at the substituent (particularly, at a double bond thereof) in the linking group represented by J from the viewpoint of more remarkably exhibiting the effect of the present invention.

The polymer of the present invention may consist of only the structural unit derived from the compound (A), but may further contain a structural unit derived from a monomer (B) other than the compound (A). From the viewpoint of more remarkably exhibiting the effect of the present invention, the content of the structural unit derived from the compound (A) in the polymer of the present invention is preferably 10 mol % or more, more preferably 30 mol % or more, still more preferably 50 mol % or more, and may be 80 mol % or more, 90 mol % or more, or even 100 mol %.

The monomer (B) is not particularly limited, and a monomer copolymerizable with the compound (A) is usable. Examples thereof include a monofunctional monomer (B1) and/or a polyfunctional monomer (B2). The monomer (B) is preferably the monofunctional monomer (B1) from the viewpoint of more remarkably exhibiting the effect of the present invention.

As the monofunctional monomer (B1), a monomer having one reactive double bond is preferably used, and examples thereof include:
  a vinyl monomer, such as styrene, 2-methylstyrene, vinyl acetate, and vinyl chloride;
  an alkyl (meth)acrylate, such as methyl (meth)acrylate, propyl (meth)acrylate, butyl (meth)acrylate, pentyl (meth)acrylate, and hexyl (meth)acrylate;
  a (meth)acrylic acid ester having a hydroxy group, such as 2-hydroxyethyl (meth)acrylate, hydroxypropyl (meth)acrylate, hydroxybutyl (meth)acrylate, and a caprolactone-modified 2-hydroxyethyl (meth)acrylate;
  a (meth)acrylate having an alkylene glycol structure, such as methoxydiethylene glycol (meth)acrylate, ethoxydiethylene glycol (meth)acrylate, isooctyloxydiethylene glycol (meth)acrylate, phenoxytriethylene glycol (meth)acrylate, methoxytriethylene glycol (meth)acrylate, and methoxypolyethylene glycol (meth)acrylate;
  a silane- or silyl-terminated (meth)acrylate, such as 2-trimethylsiloxyethyl (meth)acrylate;
  a (meth)acrylic acid ester having a terminal epoxy group, such as glycidyl (meth)acrylate and 3,4-epoxycyclohexylmethyl (meth)acrylate; and
  an unsaturated dicarboxylic acid, such as maleic anhydride and derivatives thereof.

The monofunctional monomer (B1) may be used alone or in combination of two or more.

From the viewpoint of more remarkably exhibiting the effect of the present invention, the monofunctional monomer (B1) is preferably an alkyl (meth)acrylate and more preferably methyl (meth)acrylate, propyl (meth)acrylate, butyl (meth)acrylate, pentyl (meth)acrylate, and hexyl (meth)acrylate are more preferable, or methyl (meth)acrylate.

When the polymer of the present invention comprises the structural unit derived from the monofunctional monomer (B1), the molar ratio of the structural unit derived from the compound (A) ("structural unit (A)") and the structural unit derived from the monofunctional monomer (B1) ("structural unit (B1)") is not particularly limited, but the ratio of (structural unit (A))/(structural unit (B1)) is preferably 99/1 to 1/99, more preferably 80/20 to 20/80, and still more preferably 60/40 to 40/60 from the viewpoint of more remarkably exhibiting the effect of the present invention.

The polyfunctional monomer (B2) is not particularly limited, and examples thereof include those described below as the polyfunctional monomer that may be blended in the resin composition.

The method for producing the polymer of the present invention is not particularly limited, and the polymer is obtained by polymerizing the compound (A) and, if necessary, the other monomer (B). As the polymerization reaction, a radical polymerization method is preferably employed because a polymer is obtained more efficiently. A specific method of the radical polymerization method is not particularly limited, and any method, such as emulsion polymerization, suspension polymerization, solution polymerization, or bulk polymerization, may be employed. In particular, suspension polymerization is preferable from the viewpoint of easy washing.

In the case of polymerization by suspension polymerization, the polymerization temperature is preferably 30 to 120° C. and more preferably 50 to 100° C.

The weight average molecular weight (Mw) of the polymer of the present invention is not particularly limited, but preferably 5,000 or more, more preferably 10,000 or more, and still more preferably 30,000 or more from the viewpoint of curability. The upper limit of the weight average molecular weight (Mw) is not particularly limited, and the weight average molecular weight (Mw) is, for example, 1,000,000 or less, and further 100,000 or less.

The use of the polymer of the present invention is not particularly limited, but the polymer is preferably used as a component of an oxygen absorbent because the polymer is excellent in the oxygen absorbability and a resin composition obtained by blending the polymer or a composition comprising the polymer as an oxygen absorbent has an excellent curability and sufficiently polymerizes for curing even in the presence of oxygen in an air atmosphere to form a cured product having an excellent appearance.

Oxygen Absorbent

The oxygen absorbent of the present invention comprises the polymer mentioned above. The content of the polymer in the oxygen absorbent is not particularly limited, but is preferably 50% by mass or more, more preferably 60% by mass or more, still more preferably 70% by mass or more, and particularly preferably 80% by mass or more, and may be 85% by mass or more, 90% by mass or more, or substantially 100% by mass from the viewpoint of effectively absorbing oxygen. From the viewpoint of the production cost of the oxygen absorbent, the content may be 99.9% by mass or less and further 99.8% by mass or less.

The oxygen absorbent has a sufficient oxygen absorbability because it comprises the polymer of the present invention and may further contain a transition metal salt to further improve the oxygen absorbability.

Examples of the transition metal of the transition metal salt include a transition metal element in period 4 of the periodic table, such as titanium, vanadium, chromium, manganese, iron, cobalt, nickel, and copper, and a transition metal element in period 5 of the periodic table, such as ruthenium and rhodium. Among these, a transition metal element in period 4 of the periodic table is preferable, manganese, iron, cobalt, nickel, and copper are more preferable, and cobalt is still more preferable from the viewpoint of improving the oxygen absorbability of the oxygen absorbent.

The counter ion of the transition metal in the transition metal salt is preferably an anion derived from an organic acid from the viewpoint of compatibility. The organic acid is preferably has 2 to 30 carbon atoms, which may be saturated or unsaturated, linear or branched, and may have a cyclic structure or a substituent. Examples thereof include acetic acid, stearic acid, dimethyldithiocarbamic acid, palmitic acid, 2-ethylhexanoic acid, neodecanoic acid, linoleic acid, oleic acid, capric acid, and naphthenic acid.

The transition metal salt can be any combination of the transition metal and the counter ion each mentioned above. From the viewpoint of the balance between the production cost and the oxygen absorbability, cobalt 2-ethylhexanoate, cobalt neodecanoate, and cobalt stearate are preferable.

When the oxygen absorbent comprises the transition metal salt, the content thereof is preferably 0.001 to 10 mol %, more preferably 0.005 to 5 mol %, still more preferably 0.01 to 1 mol %, and particularly preferably 0.1 to 1 mol % each based on the vinyl group in the polymer. When the content of the transition metal salt is within the above range, the oxygen absorbability is more effectively imparted to the oxygen absorbent.

The oxygen absorbent may contain, in addition to the polymer and the transition metal salt, various additives as long as the effect of the present invention is not adversely affected. Examples thereof include a filler, an ultraviolet absorber, a pigment, a viscosity improver, a shrinkage reducing agent, an aging inhibitor, a plasticizer, an aggregate, a flame retardant, a stabilizer, a fiber reinforcement, a dye, an antioxidant, a leveling agent, and an anti-sagging agent.

Resin Composition

The resin composition of the present invention comprises the oxygen absorbent and a polyfunctional monomer and/or a resin.

From the viewpoint of the curability of the resin composition to be obtained, the content of the oxygen absorbent in the resin composition is not particularly limited, but is preferably 0.1% by mass or more, more preferably 0.2% by mass or more, and still more preferably 0.5% by mass or more from the viewpoint of the curability of the resin composition to be obtained. In addition, the content is preferably 50% by mass or less, more preferably 10% by mass or less, and still more preferably 5% by mass or less.

Polyfunctional Monomer

As the polyfunctional monomer that can be contained in the resin composition, a compound having two or more polymerizable groups in the molecule is preferably used. Examples of the polymerizable group include a radical polymerizable group, such as a (meth)acryloyl group and a vinyl group, and a cation polymerizable group, such as an epoxy group. The polyfunctional monomer is preferably a compound having two or more radical polymerizable groups in the molecule. Examples of the polyfunctional monomer include a multi-(meth)acrylate having two or more (meth)acryloyloxy groups in the molecule and a (meth)acryloyl compound having an epoxy group. The multi-(meth)acrylate may have a hydroxy group. The resin composition may contain the polyfunctional monomer may be contained alone or in combination of two or more.

As the multi-(meth)acrylate, a (meth)acrylate of a polyhydric alcohol, such as diol or triol, is usable, and examples thereof include ethylene glycol di(meth)acrylate, diethylene glycol di(meth)acrylate, dipropylene glycol di(meth)acrylate, tripropylene glycol di(meth)acrylate, 1,3-butanediol di(meth)acrylate, 1,4-butanediol di(meth)acrylate, 1,6-hexamethylene di(meth)acrylate, neopentyl glycol di(meth)acrylate, 1,9-nonanediol di(meth)acrylate, 1,10-decanediol di(meth)acrylate, tricyclodecanedimethanol di(meth)acrylate, glycerin di(meth)acrylate, di(meth)acrylate of a hydrogenated bisphenol A or a hydrogenated bisphenol F, polyethylene glycol di(meth)acrylate, polypropylene glycol di(meth)acrylate, pentaerythritol tetra(meth)acrylate, dipentaerythritol hexa(meth)acrylate, and trimethylolpropane tri(meth)acrylate.

Examples of the multi-(meth)acrylate having a hydroxy group include glycerol di(meth)acrylate, trimethylolpropane di(meth)acrylate, pentaerythritol tri(meth)acrylate, pentaerythritol di(meth)acrylate, and dipentaerythritol monohydroxypenta(meth)acrylate.

Example of the (meth)acryloyl compound having an epoxy group include a (meth)acrylic acid ester having a terminal epoxy group, such as glycidyl (meth)acrylate.

Among these polyfunctional monomers, from the viewpoint of the water resistance of the obtained cured product, the multi-(meth)acrylate is preferable, and 1,6-hexamethylene di(meth)acrylate, 1,9-nonanediol di(meth)acrylate, and pentaerythritol tri(meth)acrylate are more preferable.

Resin

Examples of the resin usable in the resin composition include resins used in coating materials, adhesives, coating agents. The resin may be a radical polymerizable resin, such as a resin having a double bond that undergoes a radical reaction, or may be an active energy ray-curable resin, such as a UV-curable resin. The resin is, although depending on its use, preferably an active energy ray-curable resin because the effect of the present invention is more remarkably exhibited.

Specific examples of the resin include a resin curable by radical polymerization reaction, such as an unsaturated polyester resin, a vinyl ester resin, a (meth)acrylic resin having a polymerizable group, and an urethane (meth)acrylate resins; a partially or completely saponified product of a polyvinyl alcohol, an ethylene-vinyl acetate copolymer, and an ethylene-vinyl acetate copolymer; and a resin having oxygen barrier properties, such as an epoxy resin, a polyester resin, a polyolefin resin, and a cyclic polyolefin resin.

In addition to the above resins, a fluororesin, a polyamide resin, such as polyamide 66, a polycarbonate resin, and a polyurethane resin may be used as necessary.

Examples of the unsaturated polyester resin include a copolymer of a polyhydric alcohol with an α,β-unsaturated polybasic acid and/or another polybasic acid, such as a propylene glycol-phthalic anhydride-maleic anhydride copolymer and an ethylene glycol-phthalic anhydride-maleic anhydride copolymer, and a mixture of the above copolymer with a radical polymerizable monomer, such as styrene. The copolymer may further contain a glycidyl compound of an unsaturated alcohol, such as allyl glycidyl ether, as one of copolymerization components.

Examples of the vinyl ester resin include a resin obtained by adding (meth)acrylic acid to an epoxy resin, such as a resin obtained by adding (meth)acrylic acid to the terminal of a bisphenol A type epoxy resin.

Examples of the urethane (meth)acrylate resin include a resin obtained by adding (meth)acrylic acid or a (meth)acrylate having a hydroxy group to a polymer having remaining isocyanate group that is synthesized from a polyhydric alcohol and an excess of a multi-isocyanate.

Examples of the polyhydric alcohol include ethylene glycol, 1,2-propanediol, 1,3-propanediol, neopentyl glycol, a hydrogenated bisphenol A, and a hydrogenated bisphenol F.

Examples of the multi-isocyanate include trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, lysine diisocyanate, diphenylmethane diisocyanate, and isophorone diisocyanate, with hexamethylene diisocyanate being preferable because of its excellent curability.

The urethane (meth)acrylate resin is preferably one obtained by reacting hexamethylene diisocyanate as the multi-isocyanate and pentaerythritol tri(meth)acrylate as the (meth)acrylate having a hydroxy group.

The total content of the polyfunctional monomer and the resin in the resin composition is not particularly limited and can be appropriately adjusted according to the use of the resin composition. From the viewpoint of curability of the resin composition to be obtained, the content is preferably 30% by mass or more, more preferably 50% by mass or more, and still more preferably 70% by mass or more. The upper limit of the content is not particularly limited, and may be, for example, 99% by mass or less.

Polymerization Initiator

The resin composition preferably further comprises a polymerization initiator from the viewpoint of further improving the curability.

The type of the polymerization initiator is not particularly limited, and may be appropriately selected depending on the type of the polyfunctional monomer or resin (particularly, radical polymerizable resin) to be used. Specifically, a radical polymerization initiator, a cation polymerization initiator, an anion polymerization initiator may be used, and a radical polymerization initiator is preferable from the viewpoint of more remarkably exhibiting the effect of the present invention. Examples of the radical polymerization initiator include a thermal radical polymerization initiator that generates radicals by heat and a photoradical polymerization initiator that generates radicals by light.

Examples of the polymerization initiator include an organic peroxide that include a diacyl peroxide, such as benzoyl peroxide; a peroxyester, such as t-butyl peroxybenzoate; a hydroperoxide, such as cumene hydroperoxide; a dialkyl peroxide, such as dicumyl peroxide; a ketone peroxide, such as methyl ethyl ketone peroxide and acetylacetone peroxide; a peroxyketal; an alkyl peroxyesters; and a peroxycarbonate.

In addition, a commercially available radical polymerization initiator can be used. Examples thereof include Irgacure (registered trademark, the same applies hereinafter) 651, Irgacure 184, Irgacure 2959, Irgacure 127, Irgacure 907, Irgacure 369, Irgacure 379, Irgacure 819, Irgacure 784, Irgacure OXE01, Irgacure OXE02, and Irgacure 754 (all manufactured by BASF). These may be used alone or in combination of two or more.

The content of the polymerization initiator in the resin composition is not particularly limited. From the viewpoint of more remarkably exhibiting the effect of the present invention, the content is preferably 0.001% by mass or more, more preferably 0.01% by mass or more, still more preferably 0.1% by mass or more, and particularly preferably 1% by mass or more, and the content is preferably 10% by mass or less, and more preferably 5% by mass or less.

Other Components

The resin composition may further contain a component other than the oxygen absorbent, the polyfunctional monomer, the resin, and the polymerization initiator each described above. Examples thereof include a diluent, a pigment, a dye, a filler, an ultraviolet absorber, a viscosity improver, a shrinkage reducing agent, an aging inhibitor, a plasticizer, an aggregate, a flame retardant, a stabilizer, a fiber reinforcement, an antioxidant, a leveling agent, and an anti-sagging agent.

Examples of the diluent include styrene and a (meth)acrylic acid ester, and from the viewpoint of the curability, a (meth)acrylic acid ester is preferable. Examples of the pigment include titanium oxide, red iron oxide, aniline black, carbon black, cyanine blue, and chrome yellow. Examples of the filler include talc, mica, kaolin, calcium carbonate, and clay.

The method for producing the resin composition is not particularly limited, and the resin composition can be produced by mixing the oxygen absorbent, the polyfunctional monomer and/or the resin, and if necessary, a polymerization initiator and other components each described above.

Curing Method

The method for curing the resin composition is not particularly limited, and may be appropriately selected depending on the type of the polyfunctional monomer, the resin (particularly, the radical polymerizable resin), and the polymerization initiator to be used. When the resin composition comprises a photoradical polymerization initiator, the resin composition is cured, for example, by the irradiation with active energy ray, such as UV. When the resin composition comprises a thermal radical polymerization initiator, the resin composition is cured, for example, by heating. When the resin composition comprises both types of polymerization initiator, heating may be performed after irradiation with active energy ray. A method of curing the resin composition by irradiation with active energy ray is, although depending on its use, preferable because the effect of the present invention is more remarkably exhibited.

Use of Resin Composition

The use of the resin composition is not particularly limited. Because the resin composition has an excellent curability that allows the resin composition to sufficiently polymerize for curing even in the presence of oxygen in an air atmosphere to form a cured product having an excellent appearance, the resin composition is preferably used as a curable resin composition, such as a coating material (a UV coating material, a UV ink), an adhesive, and a coating agent. By using the resin composition, a cured product, such as a coating film, an adhesive layer, and a coating layer each being excellent in physical properties and appearance, is obtained.

EXAMPLES

Hereinafter, the present invention will be described in detail with reference to examples, but the present invention is not limited to these examples.

Production Example 1: Synthesis of 1,3-bis(3-methyl-2-butenoxy)-2-methacryloyloxypropane In a reactor equipped with a stirrer, a thermometer, and a dropping funnel, 410.2 g of acetonitrile, 298.1 g (1.31 mol) of 1,3-bis(3-methyl-2-butenoxy)-2-hydroxypropane, and 218.3 g (2.16 mol) of triethylamine were charged under an air stream. While maintaining the internal temperature at 15° C. or lower, 166.9 g (1.60 mol) of methacrylic chloride containing 2200 ppm of p-methoxyphenol as a polymerization inhibitor was added dropwise with stirring, and the temperature was raised to 25° C. after the dropwise addition. The mixture was stirred at an internal temperature of 25° C. for 1.5 h. After adding 167.1 g of ion-exchanged water and 1.70 g of p-dimethylaminopyridine to the reaction solution, the mixture was stirred at 25° C. for 2 h. After confirming the decomposition of the by-produced methacrylic anhydride, the mixture was extracted three times with ethyl acetate. The organic layer was successively washed with a 2% by mass hydrochloric acid, a 3% by mass aqueous solution of sodium hydrogen carbonate, and a saturated brine, and then dried over sodium sulfate. The obtained organic layer was purified by distillation to obtain 300.0 g (1.012 mol; yield 77.6%) of 1,3-bis(3-methyl-2-butenoxy)-2-methacryloyloxypropane represented by formula (A-1). The measured results of $^1$H-NMR are shown below.

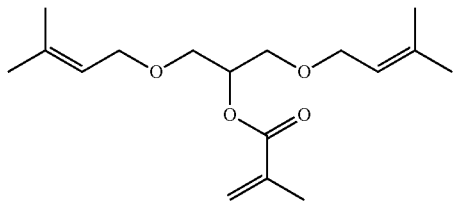

(A-1)

$^1$H-NMR (400 MH z, CDCl$_3$, TMS) δ: 6.14 (s, 1H), 5.56 (quin, J=1.6 Hz, 1H), 5.32 (tquin, J=4.0, 1.6 Hz, 2H), 5.18 (quin, J=5.2 Hz, 1H), 3.99 (dq, J=14.8, 3.2 Hz, 4H), 3.62 (d, J=5.2 Hz, 4H), 1.95. (d, J=1.6 Hz, 3H), 1.74 (s, 6H), 1.66 (s, 6H)

Production Example 2: Synthesis of 1,3-diallyloxy-2-methacryloyloxypropane

In a reactor equipped with a stirrer, a thermometer, and a dropping funnel, 81.7 g of acetonitrile, 50.17 g of 1,3-diallyloxy-2-hydroxypropane (0.291 mol, manufactured by Tokyo Chemical Industry Co., Ltd.), 48.5 g (0.480 mol) of triethylamine, and 0.05 g of "Quino Power 40" (manufactured by Kawasaki Kasei Chemicals Ltd.) were charged under an air stream. While maintaining the internal temperature at 20° C. or lower, 37.0 g (0.354 mol) of methacrylic acid chloride containing 2000 ppm of p-methoxyphenol as a polymerization inhibitor was added dropwise with stirring, and the temperature was raised to 25° C. after the dropwise addition. The mixture was stirred at an internal temperature of 25° C. for 1.5 h. After adding 60.1 g of ion-exchanged water and 300 mg of p-dimethylaminopyridine to the reaction solution, the mixture was stirred at 25° C. for 2 h. After confirming the decomposition of the by-produced methacrylic anhydride, the mixture was extracted three times with ethyl acetate. The organic layer was successively washed with a 3% by mass hydrochloric acid, a 3% by mass aqueous solution of sodium hydrogen carbonate, and a saturated brine. The obtained organic layer was purified by distillation to obtain 79.9 g (0.333 mol; yield 57%) of 1,3-diallyloxy-2-methacryloyloxypropane represented by formula (E-1). The measured results of $^1$H-NMR are shown below.

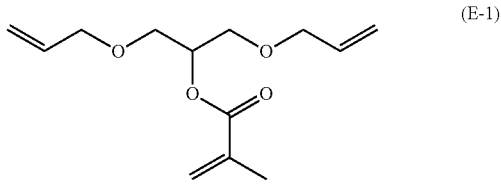 [SMILES: C=CCOCC(COCC=C)OC(=O)C(=C)C]

(E-1)

$^1$H-NMR (400 MHz, CDCl$_3$, TMS) δ: 6.14 (d, J=1.6 Hz, 1H), 5.87 (ddt, J=17.2, 10.4, 5.6 Hz, 2H), 5.57 (t, J=1.6 Hz, 1H), 5.26 (dq, J=17.2, 1.6 Hz, 2H), 5.19 (quin, J=4.8 Hz, 2H), 5.17 (dq, J=10.4, 1.6 Hz, 1H), 4.05-3.95 (m, 4H), 3.65 (d, J=4.8 Hz, 4H), 1.95 (s, 3H)

Example 1: Synthesis of Polymer (P1)

Under a nitrogen stream, in a reactor equipped with a stirrer, a thermometer, and a reflux tube, 86.4 g of ion-exchanged water, 3.4 g of an aqueous solution of sodium dihydrogen phosphate, and 0.5 g of "ROHAGIT Smv" (dispersion stabilizer) (manufactured by Rohm Co., Ltd.) were charged, and the mixture was stirred. After adding 22.5 g (0.076 mol) of 1,3-bis(3-methyl-2-butenoxy)-2-methacryloyloxypropane obtained in Production Example 1, 0.014 g of AIBN (manufactured by FUJIFILM Wako Pure Chemical Corporation), and 0.15 g of n-octylmercaptan (manufactured by FUJIFILM Wako Pure Chemical Corporation), the mixture was stirred for 6 h while maintaining the internal temperature at 70° C. Thereafter, the internal temperature was raised to 80° C., and the mixture was aged for one hour. The polymerization suspension was cooled and then dried under reduced pressure after removing the aqueous layer. The obtained polymer was washed with methanol to obtain a polymer (P1). The polymer (P1) had a number average molecular weight (Mn) of 18,500 and a weight average molecular weight (Mw) of 35,000.

Example 2: Synthesis of Polymer (P2)

Under a nitrogen stream, in a reactor equipped with a stirrer, a thermometer, and a reflux tube, 115.5 g of ion-exchanged water, 4.6 g of an aqueous solution of sodium dihydrogen phosphate, and 0.7 g of "ROHAGIT Smv"

(dispersion stabilizer) (manufactured by Rohm Co., Ltd.) were charged, and the mixture was stirred. After adding 22.5 g (0.076 mol) of 1,3-bis(3-methyl-2-butenoxy)-2-methacryloyloxypropane obtained in Production Example 1, 7.6 g of methyl methacrylate (manufactured by Kuraray Co., Ltd.), 0.018 g of AIBN (manufactured by FUJIFILM Wako Pure Chemical Corporation), and 0.20 g of n-octylmercaptan (manufactured by FUJIFILM Wako Pure Chemical Corporation), the mixture was stirred for 6 h while maintaining the internal temperature at 70° C. Thereafter, the internal temperature was raised to 80° C., and the mixture was aged for one hour. The polymerization suspension was cooled and then dried under reduced pressure after removing the aqueous layer. The obtained polymer was washed with methanol to obtain a polymer (P2). The polymer (P2) had a number average molecular weight (Mn) of 17,500 and a weight average molecular weight (Mw) of 38,900.

Comparative Example 1: Synthesis of Polymer (P3)

Under a nitrogen stream, in a reactor equipped with a stirrer, a thermometer, and a reflux tube, 115.0 g of ion-exchanged water, 4.5 g of an aqueous solution of sodium dihydrogen phosphate, and 0.7 g of "ROHAGIT Smv" (dispersion stabilizer) (manufactured by Rohm Co., Ltd.) were charged, and the mixture was stirred. After adding 30.0 g (0.125 mol) of 1,3-diallyloxy-2-methacryloyloxypropane obtained in Production Example 2, 0.018 g of AIBN (manufactured by FUJIFILM Wako Pure Chemical Corporation), and 0.20 g of n-octylmercaptan (manufactured by FUJIFILM Wako Pure Chemical Corporation), the mixture was stirred for 4 h while maintaining the internal temperature at 70° C. Thereafter, the internal temperature was raised to 80° C., and the mixture was aged for one hour. The polymerization suspension was cooled and then dried under reduced pressure after removing the aqueous layer. The obtained polymer was washed with methanol to obtain a polymer (P3). The obtained polymer (P3) was insoluble in a solvent to make it impossible to determine the molecular weight.

Comparative Example 2: Synthesis of Polymer (P4)

Under a nitrogen stream, in a reactor equipped with a stirrer, a thermometer, and a reflux tube, 115.0 g of ion-exchanged water, 4.5 g of an aqueous solution of sodium dihydrogen phosphate, and 0.7 g of "ROHAGIT Smv" (dispersion stabilizer) (manufactured by Rohm Co., Ltd.) were charged, and the mixture was stirred. After adding 21.1 g (0.088 mol) of 1,3-diallyloxy-2-methacryloyloxypropane obtained in Production Example 2, 8.8 g of methyl methacrylate (manufactured by Kuraray Co., Ltd.), 0.018 g of AIBN (manufactured by FUJIFILM Wako Pure Chemical Corporation), and 0.20 g of n-octylmercaptan (manufactured by FUJIFILM Wako Pure Chemical Corporation), the mixture was stirred for 6 h while maintaining the internal temperature at 70° C. Thereafter, the internal temperature was raised to 80° C., and the mixture was aged for one hour. The polymerization suspension was cooled and then dried under reduced pressure after removing the aqueous layer. The obtained polymer was washed with methanol to obtain a polymer (P4). The obtained polymer (P4) was insoluble in a solvent to make it impossible to determine the molecular weight.

Curability Test

The curability in an air atmosphere of the resin composition comprising each polymer synthesized above and a UV curable resin was evaluated by the appearance after curing and the thickness of the uncured portion. The smaller the thickness of the uncured portion, the more excellent the curability, because the polymerization inhibition by oxygen was effectively prevented and the polymerization for curing proceeded sufficiently even in the presence of oxygen.

A PET film (polyethylene terephthalate film having a thickness of 300 µm) having a hole with diameter of 4 cm was attached onto a PET film having no hole to prepare a cell.

Next, 100 parts by mass of 1,9-nonanediol diacrylate (manufactured by Osaka Organic Chemical Industry Ltd.) and 3 parts by mass of Irgacure 184 (manufactured by BASF) as a photopolymerization initiator were mixed. To the resultant mixture, one part by mass of any one of the polymers (P1) to (P4) obtained in Examples and Comparative Examples was further mixed to obtain each curable resin composition.

Each of the obtained curable resin compositions was put into the cell and UV-cured under irradiation conditions of an illuminance of 78 mW/cm$^2$ and an integrated light quantity of 99 mJ/cm$^2$ in an air atmosphere.

The appearance of the cured product (coating film) was observed and evaluated as "A" when it was flat and "B" when it had significant defects. The surface of the cured product was wiped with a cotton impregnated with acetone to remove the uncured product. The weight change before and after wiping was measured, and the thickness of the uncured portion was calculated from the measured value and the specific gravity of the curable resin composition. The results are shown in Table 1. The results for a curable resin composition prepared without adding any of the polymers (P1) to (P4) are shown together as Comparative Example 3.

TABLE 1

| | Polymer | Coating film appearance | Thickness of uncured portion |
|---|---|---|---|
| Example 1 | P1 | A | 4.2 µm |
| Example 2 | P2 | A | 5.2 µm |
| Comparative Example 1 | P3 | B (with unevenness) | — |
| Comparative Example 2 | P4 | B (with unevenness) | — |
| Comparative Example 3 | — | A | 6.2 µm |

As shown in Table 1, the curable resin composition comprising the polymer of Example 1 or 2 formed the coating film excellent in the appearance after curing and having the uncured portion with a small thickness, showing that these curable resin compositions were excellent in the curability because the polymerization inhibition by oxygen was effectively prevented and the polymerization for curing proceeded sufficiently even in the presence of oxygen. Therefore, when the curable resin composition is actually used as a UV coating material or a UV ink under the condition in the presence of oxygen, such as in an air atmosphere, it is expected to effectively prevent the decrease in curing rate and the occurrence of surface stickiness.

On the other hand, the curable resin composition comprising the polymer of Comparative Example 1 or 2 was inferior in the appearance of the coating film after curing and formed the uneven coating film without forming a flat coating film, showing that the curability was poor. In Comparative Example 3 in which no polymer was added, the thickness of the uncured portion after curing was thick and the curability was poor.

The invention claimed is:

1. A polymer comprising a structural unit derived from a compound (A) represented by formula (I):

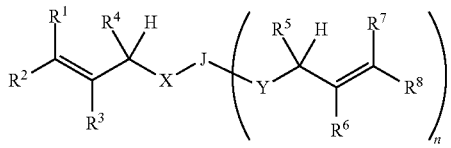

(I)

wherein:
X and Y each independently represent a chalcogen atom;
$R^1$, $R^2$, $R^7$, and $R^8$ each independently represent any one selected from the group consisting of an alkyl group having 1 to 6 carbon atoms, an alkenyl group having 2 to 6 carbon atoms, an aryl group, and an aralkyl group;
$R^3$, $R^4$, $R^5$, and $R^6$ each independently represent any one selected from the group consisting of a hydrogen atom, an alkyl group having 1 to 6 carbon atoms, an alkenyl group having 2 to 6 carbon atoms, an aryl group, and an aralkyl group;
J represents a linking group comprising an aliphatic hydrocarbon having 3 to 15 carbon atoms which has at least one substituent selected from the group consisting of a hydroxy group, a (meth)acryloyloxy group, a 4-vinylphenoxy group, and an alkenyloxy group having 2 to 6 carbon atoms;
at least one selected from the at least one substituent is any one selected from the group consisting of a (meth) acryloyloxy group, a 4-vinylphenoxy group, and an alkenyloxy group having 2 to 6 carbon atoms;
a carbon atom in the linking group may be replaced by an oxygen atom; and
n represents an integer of 1 to 5;
provided that Ys, $R^5$'s, $R^6$'s, $R^7$'s, and $R^8$'s, if present, may represent different atoms or groups, respectively.

2. The polymer according to claim 1, wherein X is an oxygen atom.

3. The polymer according to claim 1, wherein $R^3$ and $R^6$ are hydrogen atoms.

4. The polymer according to claim 1, wherein $R^4$ and $R^5$ are each independently a hydrogen atom or a methyl group.

5. The polymer according to claim 1, wherein the compound (A) is a compound (A') represented by formula (II):

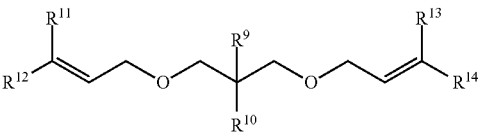

(II)

wherein:
$R^9$ represents a hydrogen atom or a methyl group;
$R^{10}$ represents any one selected from the group consisting of a (meth)acryloyloxy group, a 4-vinylphenoxy group, and an alkenyloxy group having 2 to 6 carbon atoms; and
$R^{11}$, $R^{12}$, $R^{13}$, and $R^{14}$ each independently represent any one selected from the group consisting of an alkyl group having 1 to 6 carbon atoms, an alkenyl group having 2 to 6 carbon atoms, an aryl group, and an aralkyl group.

6. The polymer according to claim 5, wherein $R^9$ is a hydrogen atom.

7. The polymer according to claim 5, wherein $R^{10}$ is a (meth)acryloyloxy group.

8. The polymer according to claim 1, wherein the polymer comprises a structural unit derived from a monomer (B) other than the compound (A).

9. The polymer according to claim 8, wherein the monomer (B) is a monofunctional monomer (B1).

10. The polymer according to claim 9, wherein the monofunctional monomer (B1) is an alkyl (meth)acrylate.

11. An oxygen absorbent comprising the polymer according to claim 1.

12. The oxygen absorbent according to claim 11, wherein the oxygen absorbent comprises a transition metal salt in an amount of 0.001 to 10 mol % based on an amount of the vinyl group in the polymer.

13. A resin composition comprising the oxygen absorbent according to claim 11 and a polyfunctional monomer and/or a resin.

14. The resin composition according to claim 13, wherein the polyfunctional monomer is a polyvalent (meth)acrylic acid ester.

15. A cured product obtained by curing the resin composition according to claim 13.

* * * * *

UNITED STATES PATENT AND TRADEMARK OFFICE
CERTIFICATE OF CORRECTION

| | |
|---|---|
| PATENT NO. | : 11,866,528 B2 |
| APPLICATION NO. | : 17/049391 |
| DATED | : January 9, 2024 |
| INVENTOR(S) | : Daiki Noguchi et al. |

It is certified that error appears in the above-identified patent and that said Letters Patent is hereby corrected as shown below:

On the Title Page

(87) PCT PUB. No., please change "WO2019/220825" to -- WO2019/208259 --.

Signed and Sealed this
Thirtieth Day of July, 2024

Katherine Kelly Vidal
*Director of the United States Patent and Trademark Office*